United States Patent [19]

Paris, deceased

[11] Patent Number: 5,302,625
[45] Date of Patent: Apr. 12, 1994

[54] METHOD FOR REDUCING THE MELT FLOW RATE OF FLAME RETARDANT EXPANDED POLYSTYRENE

[75] Inventor: Franklin A. Paris, deceased, late of Santa Cruz, Calif., by Darlene Paris, legal representative

[73] Assignee: Darlene May Paris, Santa Cruz, Calif.

[21] Appl. No.: 68,558

[22] Filed: May 27, 1993

[51] Int. Cl.⁵ .............................. C08J 9/36; C08J 9/40
[52] U.S. Cl. ..................... 521/146; 521/40.5; 521/47; 521/88; 521/92; 521/97; 521/98; 521/907
[58] Field of Search ............ 521/98, 146, 907, 92, 521/88, 97, 40.5, 47

[56] References Cited

U.S. PATENT DOCUMENTS

| | | | |
|---|---|---|---|
| 3,058,926 | 10/1962 | Eichhorn | 521/907 |
| 3,058,927 | 10/1962 | McMaster et al. | 521/907 |
| 3,058,928 | 10/1962 | Eichhorn et al. | 521/907 |
| 3,058,929 | 10/1962 | Vanderhoff et al. | 521/907 |

*Primary Examiner*—Morton Foelak
*Attorney, Agent, or Firm*—Lyon & Lyon

[57] ABSTRACT

A method for lowering the melt flow rate of flame retardant expanded polystyrene is provided. The method comprises treating the flame retardant expanded polystyrene with an aqueous solution of sodium bicarbonate. In another aspect of the present invention a method for pelletizing recycled flame retardant expanded polystyrene is provided. The method comprises treating ground flame retardant polystyrene in an aqueous solution of sodium bicarbonate; condensing the treated polystyrene; extruding the polystyrene; and pelletizing the polystyrene. In another aspect of the present invention the electrostatic build-up on polystyrene is reduced by contacting the polystyrene with an aqueous solution of sodium bicarbonate.

32 Claims, No Drawings

METHOD FOR REDUCING THE MELT FLOW RATE OF FLAME RETARDANT EXPANDED POLYSTYRENE

BACKGROUND OF THE INVENTION

1. Field of the Invention

The present invention relates to recycling expanded polystyrene, especially to the recycling of flame retardant expanded polystyrene.

2. Description of the Prior Art

Expanded polystyrene (EPS) is in wide use in applications that require enhanced resistance to fire and heat. In these situations, which may account for some 50% of all EPS use, flame retardants are frequently added to the polystyrene resins to modify the combustibility properties of the plastic. The addition of flame retardant materials results in increased ignition temperatures, and a reduction in burning rates and flame spread.

Flame retardant modifiers used include halogenated hydrocarbons. Typically, the flame retardant used in polystyrene resins is a brominated hydrocarbon. Flame retardants that can be used in conjunction with polystyrene are listed in the *Modern Plastics Encyclopedia*, Vol. 56, No. 10A, 666-670 (Oct. 1979), hereby incorporated by reference. Some of the brominated hydrocarbon flame retardants that can be used with polystyrene include: brominated alicyclic; hexabromocyclododecane; octabromodiphenyl oxide; decabromodiphenyl oxide; brominated organic; and Trisdibromopropyl antimonite.

Besides having the positive, intended effect of modifying the combustibility properties of the polystyrene, the flame retardant also increases the melt flow rate of the polystyrene. Consequently, flame retardant polystyrene flows much more readily than does standard polystyrene. This makes it difficult, if not impossible, to recycle flame retardant polystyrene because processing equipment is typically set up for the melt flow rates of untreated polystyrene, not flame retardant polystyrene. In addition, the bromine in the flame retardant additive is corrosive to the molding equipment.

Melt flow rates of polystyrene can be measured using an extrusion plastometer. The extrusion plastometer generally used in the industry to measure melt flow rates of polystyrene is described in ASTM D 1238, hereby incorporated by reference. During normal operation, resin is melted in a cylinder of the instrument for a fixed period of time; a weighted piston is then permitted to push out the resin through an orifice of a specified length and diameter. Pieces of extruded resin are then cut off at timed intervals. Using the extruded specimen weight and the time to extrude, a flow rate is calculated. Flow rates are reported in g/10 min.

Flame retardant expanded polystyrene typically has a melt flow rates substantially above that of untreated expanded polystyrene, which is referred to throughout the specification as expanded polystyrene.

Adding further to the problem of recycling polystyrene is the fact that flame retardant and expanded polystyrene products are often co-mingled in waste streams. These products, however, cannot be separated by sight; thus, the rheological properties of the waste stream are inconsistent and depend on the percentage of flame retardant polystyrene contained in the waste stream. Recycling companies, as a result, have found it difficult and expensive to recycle expanded polystyrene products from a mixed waste stream and, for the most part, have simply not recycled these products.

To recycle expanded polystyrene, the polystyrene is first ground, usually to a fine particle size, and then washed or rinsed with water. After being rinsed, the ground polystyrene is condensed by heating it in an oven to a temperature between approximately 150° C. and 200° C. Following condensing, the polystyrene is extruded into long spaghetti like strands and then pelletized. The polystyrene is pelletized by chopping up the long strands of extruded polystyrene into approximately 1/16 inch pellets. Manufacturers can then use the pellets as feed stock for an extrusion or injection molding process to manufacture new products.

If flame retardant polystyrene is mixed in with the original recycled material, each of the resulting pellets can have different rheological properties depending upon the percentage of flame retardant polystyrene making up each individual pellet. Thus, manufacturers would have a difficult time controlling their injection molding and extrusion processes because they are set up to handle melt flow rates of untreated expanded polystyrene and are not accustomed to handling a feed with inconsistent rheological properties.

Another problem with polystyrene products is that they tend to collect static electricity. This typically limits their use as packaging materials for electronic components and devices that are sensitive to electrostatic discharge (ESD). When polystyrene materials are used, the electronic components are often shielded from electrostatic discharge in metallized bags or bags treated with an anti-static agent to prevent ESD damage.

At present, a need exists for a method of treating flame retardant polystyrene to reduce its melt flow rate so that it can be economically recycled. Also, an inexpensive anti-static agent that can be easily applied to polystyrene to dissipate and prevent static build up would be desirable.

SUMMARY OF THE INVENTION

The present invention is directed to a method for reducing the melt flow rate of flame retardant polystyrene. The method comprises treating the flame retardant polystyrene with an aqueous solution of sodium bicarbonate ($NaHCO_3$). In a second embodiment of the present invention the flame retardant polystyrene is treated with an aqueous solution containing $NaHCO_3$ and acetic acid ($C_2H_4O_2$).

It is believed that the process parameters for any given application of the invention can be readily determined by the application chemical processing methods and techniques well known to those skilled in the art without undue experimentation. For example, if economics permit, longer contact times may be employed with less concentrated solutions. on the other hand, shorter contact times may provide sufficient melt flow rate reduction with higher concentration solutions or with recycle streams containing lower amounts of or finely ground flame retardant expanded polystyrene.

From the examples it may be determined that a contact time of at least about 3 minutes with an aqueous solution of at least about 3 teaspoons of sodium bicarbonate per ½ gallon of water adequately reduce the melt flow index of flame retardant expanded polystyrene. Since a finer grind of the feed stock exposes greater surface area, it should be apparent that even shorter contact times and/or lower solution concentrations could be employed to achieve the results of and are within the scope of the invention.

In another aspect of the present invention, a method for reducing the electrostatic build up on polystyrene is provided. The method comprises contacting, such as by spraying, polystyrene with an aqueous solution of sodium bicarbonate ($NaHCO_3$).

Accordingly, it is an object of the present invention to provide a method of treating flame retardant polystyrene to reduce its melt flow rate. It is a further object of the present invention to provide a method of treating flame retardant expanded polystyrene products found in co-mingled waste streams so that they can be recycled in conjunction with untreated expanded polystyrene products without separation.

The above and other objects, features and advantages of the present invention will become apparent from the following detailed description of the preferred embodiments.

DETAILED DESCRIPTION OF THE PREFERRED EMBODIMENTS

By the method according to the present embodiment of the invention, flame retardant expanded polystyrene can be made to exhibit melt flow rate properties similar to untreated expanded polystyrene. This is accomplished by exposing the flame retardant expanded polystyrene to an aqueous solution of sodium bicarbonate. In the present embodiment the exposure is accomplished by a soaking step. It will be readily apparent to those skilled in the art that any other method for exposing the flame retardant expanded polystyrene to the sodium bicarbonate solution may be used. For example, methods such as a continuous process which provides adequate contact time are well known to those skilled in the art.

After soaking in the solution of sodium bicarbonate, the flame retardant expanded polystyrene will burn as if it contains no flame retardant additive. Further, the melt flow rate of the flame retardant expanded polystyrene is reduced following treatment with the aqueous solution.

The amount the melt flow rate is reduced depends on several factors. These include soak time, grind size of the polystyrene being treated, temperature of the aqueous solution, and concentration of the sodium bicarbonate solution.

The solution preferably contains from 3 to 5 teaspoons of granular sodium bicarbonate per one-half gallon of water. More preferably, the solution contains approximately 5 teaspoons of sodium bicarbonate per ½ gallon of water. In the examples below commonly available sodium bicarbonate of a purity believed to be above 99% was used. Less pure mixtures could also be used by adjusting the amount added to give a sufficient sodium bicarbonate concentration to reduce the melt flow index, provided impurities harmful to the process are not included.

Soaking time is very flexible and can be set in a range any where from approximately 3 minutes upwards. In one test a soak time of 3 days provided acceptable results. Preferably the treatment time is set in a range of approximately 5 minutes to 20 minutes, and most preferably in a range of approximately 5 to 10 minutes. As noted above it may be possible to adjust the process parameters such that a shorter soak time may be used.

With respect to temperature, the process according to the present invention generally works better at warmer than colder temperatures. Preferably the temperature of the aqueous solution is in the range of 60° to 80° F. Better results are also generally obtained with finely ground polystyrene than with shaved strips or blocks of polystyrene. Typically, the finer the grind size, the better the results. This is believed to be because the surface area exposed to the sodium bicarbonate solution is increased.

Following treatment with the aqueous solution, the flame retardant expanded polystyrene preferably has a melt flow rate in the range of 12 to 25 g/10 min. when tested according to ASTM D 1238-65T (cond. G). Even more preferably, the melt flow rate of the polystyrene is in the range of approximately 10 to 20 g/10 min. Most preferably, the melt flow rate following treatment is approximately 10 g/10 min.

In another embodiment of the present invention, flame retardant expanded polystyrene is soaked in an aqueous solution containing both sodium bicarbonate and acetic acid. The source of acetic acid utilized in the examples below was apple cider vinegar. Those skilled in the art will appreciate that other sources of acetic acid may be used. The acetic acid concentration is preferably the equivalent of approximately 2 teaspoons of apple cider vinegar containing 5% acetic acid per ½ gallon of water. The use of other acetic acid solutions providing the benefits of the invention are also within its scope. The factors affecting the efficiency of the process are the same for this embodiment as for the first embodiment of the present invention.

In yet another embodiment of the present invention, the melt flow rate of flame retardant expanded polystyrene is reduced while it is in a co-mingled waste stream containing both flame retardant expanded polystyrene and expanded polystyrene. The co-mingled waste streams, which can be treated by the method of the invention, may contain flame retardant polystyrene in any proportion. Typically commercial recycle waste streams contain 50–60% flame retardant expanded polystyrene. However, the invention is not limited by the waste stream compositions and waste streams containing 1%, 5%, 20%, 40%, 60%, 80% 95% and 99% flame retardant expanded polystyrene could be treated by the method of the invention.

The commercial waste stream is treated with an aqueous solution of sodium bicarbonate or sodium bicarbonate and acetic acid, in accordance with the above embodiments. Again, it is preferable for the co-mingled waste stream to be finely ground before being treated.

In yet another embodiment of the present invention, a method for pelletizing flame retardant expanded polystyrene is also provided. In this embodiment, ground recycled flame retardant expanded polystyrene is exposed to an aqueous solution of sodium bicarbonate, or to a solution of sodium bicarbonate and acetic acid, for example by soaking, to reduce the melt flow rate of the flame retardant expanded polystyrene to the range of approximately 12 to 25 g/10 min. Preferably the melt flow rate is reduced to the range of 10 to 20 g/10 min., and most preferably the melt flow rate is reduced to approximately 10 g/10 min. The ground recycled expanded polystyrene can be treated alone or can be co-mingled with expanded polystyrene in the feed stock to the process of this method.

After soaking in the aqueous solution, the flame retardant expanded polystyrene is condensed in an oven. The treated and condensed flame retardant expanded polystyrene is then extruded into long spaghetti like strands. Pelletized polystyrene feed stock is produced from the extruded polystyrene by chopping it up into short pieces, preferably approximately 1/16 of an inch long.

Because the melt flow rate of the pellets of recycled flame retardant polystyrene produced by the method of the invention is comparable to that of non-flame retardant expanded polystyrene, manufacturers using injection molding and extrusion processes to manufacture polystyrene products can use the pellets of recycled flame retardant expanded polystyrene directly in their molding processes. Thus, the process according to the present embodiment of the invention provides a method for pelletizing recycled flame retardant polystyrene so that it can be used in processing equipment set up to process non-flame retardant polystyrene. Furthermore, an advantage of the present process is that flame retardant polystyrene can be treated in a co-mingled waste stream. This is important because most waste streams of EPS products reaching a recycling center contain both flame retardant polystyrene and non-flame retardant polystyrene.

In still another embodiment of the present invention, it was found that the electrostatic build up on ground EPS can be dissipated by spraying the EPS with the aqueous mixture of sodium bicarbonate or sodium bicarbonate and acetic acid. After spraying the EPS, it was found that it was no longer charged with static electricity. It is believed that other polystyrene products, such as injection molded and extruded polystyrene products can also be sprayed with the mixture to prevent the build up of static electricity on these products.

The following examples are set forth for the purpose of illustrating the invention only and are not to be construed as limitations on the present invention except as set forth in the appended claims.

EXAMPLE 1

An aqueous solution of sodium bicarbonate was prepared. "ARM & HAMMER ®" baking soda was used for the source of sodium bicarbonate in this, and all other examples discussed in the specification. According to *The Merk Index*, 948 (8th ed. 1968), sodium bicarbonate sold in commerce is about 99.8% pure. Flame retardant expanded polystyrene from a recycling center was then submerged in the aqueous solution and samples allowed to soak in the solution for 5 minutes, 1 day, and 3 days. The treated flame retardant polystyrene for each of the tests was ignited. From this test, it was determined that each of the treated polystyrene samples burned as if they were no longer flame retardant.

EXAMPLE 2

A ½ gallon aqueous solution containing 3 teaspoons of baking soda was prepared. Both finely ground and large pieces of flame retardant expanded polystyrene were placed into the solution to soak. After soaking for 10 minutes, some of the polystyrene was removed and allowed to dry. Both the small and large pieces burned as if they were not flame retardant. The remainder of the finely ground and large pieces of polystyrene were removed from the solution after 20 minutes. Again, both the finely ground and large pieces burned as if they were not fire retardant. However, with both the 10 and 20 minute treatments, the smaller pieces burned much faster than the larger pieces.

EXAMPLE 3

A test solution comprising ½ gallon of water, 4 teaspoons of baking soda, and 2 teaspoons of apple cider vinegar was prepared. The apple cider vinegar used in the experiment was manufactured by Heinz and had a 5% acetic acid content. Flame retardant expanded polystyrene samples obtained from a recycling yard were allowed to soak in the solution for 10 min. and 20 min., respectively. After the 20 min. sample was removed, another teaspoon of baking soda was added to the solution to bring the total amount of baking soda added to 5 teaspoons. Again, flame retardant expanded polystyrene samples were permitted to soak for 10 min. and 20 min. All of the test samples burned well, like non-flame retardant expanded polystyrene. However, the sodium bicarbonate solution appeared to work better after the fifth teaspoon of sodium bicarbonate was added. Furthermore, the flame retardant expanded polystyrene treated with the aqueous solution of baking soda and apple cider vinegar appeared to burn better than flame retardant expanded polystyrene treated with the aqueous solution containing just baking soda.

EXAMPLE 4

An aqueous solution containing 3 teaspoons of baking soda and 2 teaspoons of apple cider vinegar in ½ gallon of water was prepared. A 12 g mixture of expanded polystyrene was soaked in the mixture. The 12 g mixture contained 6 g of flame retardant expanded polystyrene and 6 g of non-flame retardant expanded polystyrene. Following the treatment, the melt flow rate of the treated mixture was tested. The results of the melt flow tests indicated that the average melt flow rate of the treated mixture was 22.35 g/10 min. Whereas, the melt flow rate of the untreated flame retardant expanded polystyrene was 41.05 g/10 min.

EXAMPLE 5

A ¾ gallon test solution containing 18.11 g of baking soda was prepared. Co-mingled mixtures of expanded polystyrene containing at least 50% flame retardant expanded polystyrene were soaked in the solution. After soaking, each of the co-mingled mixtures were condensed at approximately 250° F. The condensed mixtures were then melt flow tested using a TINIUS OLSEN extrusion plastometer. The test conditions of the test were 200° C. and a 5.0 kg weight. In addition, control melt flow tests were performed on untreated flame retardant expanded polystyrene and non-flame retardant expanded polystyrene. The results of the tests are listed below.

| Test No. | Melt Flow Rate (g/10 min.) |
| --- | --- |
| 1 | 47.24 |
| 2 | 29.69 |
| 3 | 33.62 |
| 4 | 37.80 |
| 5 | 39.20 |
| 6 | 38.81 |
| 7 | 12.86 |
| 8 | 28.40 |
| 9 | 18.55 |
| 10 | 19.97 |
| 11 | 14.24 |
| 12 | 13.25 |
| 13 | 12.96 |
| 14 | 13.40 |
| 15 | 10.56 |

-continued

| Test No. | Melt Flow Rate (g/10 min.) |
| --- | --- |
| 16 | 12.50 |
| 17 | 11.95 |
| 18 | 12.25 |
| 19 | 11.42 |
| 20 | 11.05 |
| 21 | 10.55 |
| 22 | 11.38 |
| 23 | 10.71 |
| 24 | 10.70 |

Test Nos. 1-6 correspond to the melt flow rate of untreated flame retardant expanded polystyrene test samples. Test Nos. 7/14 10 correspond to the melt flow rate of untreated non-flame retardant expanded polystyrene test samples, and Test Nos. 11-24 correspond to the melt flow rates of the various co-mingled test samples treated with the aqueous solution. The melt flow rates reported for each of the tests is the average melt flow rate calculated from at least three extruded, timed samples.

As can be seen from the table, the melt flow rate of the flame retardant expanded polystyrene is reduced significantly after soaking in the aqueous solution of sodium bicarbonate.

Although the invention has been described with reference to preferred embodiments and specific examples, it will readily be appreciated by those of ordinary skill in the art that many modifications and adaptations of the invention are possible without departure from the spirit and scope of the invention as claimed hereinafter. For example, while the processes according to the present invention have been described in terms of a batch process, the soaking according to the present invention could be accomplished by a continuous flow process. Similarly soak times could likely be reduced by more finely grinding the feed stock.

What is claimed:

1. A method for lowering the melt flow rate of flame retardant expanded polystyrene, comprising exposing the polystyrene to an aqueous solution of sodium bicarbonate for a time sufficient to reduce the melt flow rate of said flame retardant expanded polystyrene.

2. A method for lowering the melt flow rate of flame retardant expanded polystyrene to at or below the melt flow rate of non-flame retardant expanded polystyrene, comprising exposing the polystyrene to an aqueous solution of sodium bicarbonate, said aqueous solution being of at least a minimum concentration sufficient to achieve the reduction in melt flow rate in the time of exposure.

3. A method for lowering the melt flow rate of flame retardant expanded polystyrene according to claim 1, wherein said aqueous solution also contains acetic acid.

4. A method for lowering the melt flow rate of flame retardant expanded polystyrene according to claim 1, wherein said aqueous solution contains at least 3 teaspoons of granular sodium bicarbonate per ½ gallon of water.

5. A method for lowering the melt flow rate of flame retardant expanded polystyrene according to claim 1, wherein said aqueous solution contains from about 3 to about 5 teaspoons of granular sodium bicarbonate per ½ gallon of water.

6. A method for lowering the melt flow rate of flame retardant expanded polystyrene according to claim 1, wherein said aqueous solution contains at least about 24 grams sodium bicarbonate per gallon of water.

7. A method for lowering the melt flow rate of flame retardant expanded polystyrene according to claim 2, wherein said aqueous solution contains about 2 teaspoons of a 5% acetic acid solution per ½ gallon of water.

8. A method for lowering the melt flow rate of flame retardant expanded polystyrene according to claim 3, wherein said aqueous solution also contains about 2 teaspoons of a 5% acetic acid solution per ½ gallon of water.

9. A method for lowering the melt flow rate of flame retardant expanded polystyrene according to claim 1, wherein the melt flow rate of the polystyrene after soaking is from about 10 g/10 min. to about 25 g/10 min.

10. A method for lowering the melt flow rate of flame retardant expanded polystyrene according to claim 1, wherein the polystyrene is exposed to said solution for at least about 3 minutes.

11. A method for lowering the melt flow rate of flame retardant expanded polystyrene according to claim 1, wherein the polystyrene is exposed to said solution for a period from about 5 to about 20 minutes.

12. A method for lowering the melt flow rate of flame retardant expanded polystyrene according to claim 1. wherein the polystyrene is exposed to said solution for at least about 5 minutes.

13. A method for lowering the melt flow rate of flame retardant expanded polystyrene according to claim 1, wherein the flame retardant expanded polystyrene is co-mingled with non-flame retardant expanded polystyrene.

14. A method for lowering the melt flow rate of flame retardant expanded polystyrene, comprising exposing the polystyrene for at least about 3 minutes to an aqueous solution containing from about 6 to about 10 teaspoons of granular sodium bicarbonate per gallon of water.

15. A method for lowering the melt flow rate of flame retardant expanded polystyrene according to claim 14, wherein said solution also contains acetic acid.

16. A method for lowering the melt flow rate of flame retardant expanded polystyrene according to claim 14, wherein said solution also contains about 4 teaspoons of a 5% acetic acid solution per gallon of water.

17. A method for lowering the melt flow rate of flame retardant expanded polystyrene according to claim 14, wherein the flame retardant expanded polystyrene is co-mingled with non-flame retardant expanded polystyrene.

18. A method for lowering the melt flow rate of flame retardant expanded polystyrene according to claim 14, wherein the polystyrene is exposed to said solution for a period from about 5 to 20 minutes.

19. A method for lowering the melt flow rate of flame retardant expanded polystyrene according to claim 14, wherein the polystyrene is exposed to said solution for at least about 5 minutes.

20. A method for lowering the melt flow rate of flame retardant expanded polystyrene according to claim 14, wherein the melt flow rate of the polystyrene after exposure is from about 10 g/10 min. to about 25 g/10 min.

21. A method for lowering the melt flow rate of flame retardant expanded polystyrene, comprising exposing the polystyrene for at least about 3 minutes to an aqueous solution containing from about 6 to about 10 teaspoons of granular sodium bicarbonate per gallon of water and acetic acid, and wherein the melt flow rate of the polystyrene after exposing is from about 10 g/10 min. to about 25 g/10 min.

22. A method for lowering the melt flow rate of flame retardant expanded polystyrene according to claim 21, wherein said solution contains about 4 teaspoons of a 5% acetic acid solution per gallon of water.

23. A method for lowering the melt flow rate of flame retardant expanded polystyrene according to claim 21, wherein the polystyrene is exposed to said solution for a period from about 5 to about 20 minutes.

24. A method for lowering the melt flow rate of flame retardant expanded polystyrene according to claim 21, wherein the polystyrene is exposed to said solution for at least about 5 minutes.

25. A method for lowering the melt flow rate of flame retardant expanded polystyrene according to claim 21, wherein the flame retardant expanded polystyrene is co-mingled with non-flame retardant expanded polystyrene.

26. A method for pelletizing a ground recycled flame retardant expanded polystyrene feed stock, comprising:
   a. exposing ground recycled flame retardant polystyrene to an aqueous solution of sodium bicarbonate;
   b. removing said exposed polystyrene from said solution;
   c. condensing the exposed polystyrene;
   d. extruding the condensed polystyrene; and
   e. pelletizing the extruded polystyrene.

27. A method for pelletizing recycled flame retardant expanded polystyrene according to claim 26, wherein said aqueous solution also contains acetic acid.

28. A method for pelletizing recycled flame retardant expanded polystyrene according to claim 26, wherein said aqueous solution contains approximately 6 to 10 teaspoons of sodium bicarbonate per gallon of water.

29. A method for pelletizing recycled flame retardant expanded polystyrene according to claim 26, wherein said feed stock comprises ground flame retardant polystyrene co-mingled with ground non-flame retardant expanded polystyrene.

30. A method for reducing the electrostatic build up on polystyrene, comprising spraying the polystyrene with an aqueous solution of sodium bicarbonate.

31. A method for reducing the electrostatic build up on polystyrene according to claim 30, wherein said solution contains at least about 6 teaspoons of sodium bicarbonate per gallon of water.

32. A method for reducing the electrostatic build up on polystyrene according to claim 30, wherein said solution also contains acetic acid.

* * * * *